United States Patent
Otake et al.

(10) Patent No.: US 11,180,680 B2
(45) Date of Patent: Nov. 23, 2021

(54) UV CURABLE SILICONE ADHESIVE COMPOSITION AND CURED PRODUCT THEREOF

(71) Applicant: SHIN-ETSU CHEMICAL CO., LTD., Tokyo (JP)

(72) Inventors: Kohei Otake, Annaka (JP); Nobuaki Matsumoto, Annaka (JP); Eri Asakura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/646,743

(22) PCT Filed: Sep. 19, 2018

(86) PCT No.: PCT/JP2018/034610
§ 371 (c)(1),
(2) Date: Mar. 12, 2020

(87) PCT Pub. No.: WO2019/065398
PCT Pub. Date: Apr. 4, 2019

(65) Prior Publication Data
US 2020/0270481 A1    Aug. 27, 2020

(30) Foreign Application Priority Data
Sep. 29, 2017    (JP) ............... JP2017-190639

(51) Int. Cl.
C08F 2/46     (2006.01)
C08F 2/50     (2006.01)
C08G 61/04    (2006.01)
C09J 4/00     (2006.01)

(52) U.S. Cl.
CPC ............. *C09J 4/00* (2013.01); *C09J 2433/00* (2013.01); *C09J 2483/00* (2013.01)

(58) Field of Classification Search
CPC ........ C09J 11/04; C09J 183/10; C09J 183/04; C09J 7/38; C09J 4/00; C09J 2483/00; C09J 2433/00; C08F 290/06
USPC ........... 522/40, 33, 6, 71, 189, 184, 1; 520/1
See application file for complete search history.

(56) References Cited

U.S. PATENT DOCUMENTS

| | | | | |
|---|---|---|---|---|
| 2003/0064232 | A1* | 4/2003 | Allen | C08L 83/06 428/447 |
| 2012/0045635 | A1* | 2/2012 | Aoki | C08L 83/00 428/220 |
| 2013/0059105 | A1* | 3/2013 | Wright | C09D 183/06 428/41.8 |
| 2016/0020131 | A1 | 1/2016 | Bower et al. | |

FOREIGN PATENT DOCUMENTS

| | | |
|---|---|---|
| JP | 2631098 B2 | 7/1997 |
| JP | 2004-176011 A | 6/2004 |
| JP | 2008-31307 A | 2/2008 |
| JP | 2010-132755 A | 6/2010 |
| JP | 5234064 B2 | 7/2013 |
| JP | 5825738 B2 | 12/2015 |
| JP | 5989417 B2 | 9/2016 |
| JP | 2017-110137 A | 6/2017 |
| JP | 2017-524250 A | 8/2017 |
| WO | WO 2017/068762 A1 | 4/2017 |

OTHER PUBLICATIONS

International Search Report, issued in PCT/JP2018/034610, dated Dec. 11, 2018.
Meitl et al., "Transfer printing by kinetic control of adhesion to an elastomeric stamp", nature materials, Nature Publishing Group, Jan. 2006, publised online: Dec. 11, 2005, vol. 5, pp. 33-38.
Murakami et al., "A Study of Fabrication of Micro/nano-mechanical Structure Using Transfer-print", Journal of the Japan Society for Precision Engineering, 2015, vol. 81, No. 4, pp. 344-348.
Written Opinion of the International Searching Authority, issued in PCT/JP2018/034610, dated Dec. 11, 2018.

* cited by examiner

*Primary Examiner* — Jessica Whiteley
(74) *Attorney, Agent, or Firm* — Birch, Stewart, Kolasch & Birch, LLP

(57) ABSTRACT

This composition contains (A) 100 parts of an organopolysiloxane having two groups represented by general formula (1)

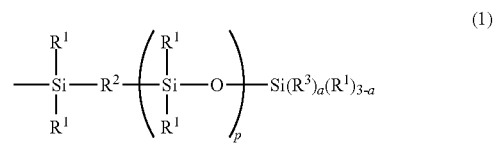

($R^1$ represents a monovalent hydrocarbon group having 1-20 carbon atoms, $R^2$ represents an oxygen atom or the like, $R^3$ represents an acryloyloxyalkyl group or the like, p represents a number satisfying $0 \leq p \leq 10$, and "a" represents a number satisfying $1 \leq a \leq 3$) per molecule, (B) 1-500 parts of a monofunctional (meth)acrylate compound not containing a siloxane structure, (C) 1-5,000 parts of an organopolysiloxane resin containing (a) an $R^4{}_3SiO_{1/2}$ unit (in the formula, $R^4$ represents a monovalent hydrocarbon group having 1-10 carbon atoms) and (b) a $SiO_{4/2}$ unit, where the molar ratio of the unit (a) to the unit (b) is in the range of 0.6 to 1.2:1, (D) 1-100 parts of fine powder silica, and (E) 0.01-20 parts of an optical polymerization initiator. The compound has good shape retention properties and curability for irradiation with ultraviolet light, and provides a cured product which has excellent adhesion suitable for a temporary fixing material.

9 Claims, 1 Drawing Sheet

UV CURABLE SILICONE ADHESIVE COMPOSITION AND CURED PRODUCT THEREOF

TECHNICAL FIELD

This invention relates to an ultraviolet (UV) cure type silicone pressure-sensitive adhesive (PSA) composition and a cured product thereof. More particularly, it relates to a UV cure type silicone PSA composition and a cured product thereof which is useful as a temporary adhesive for transferring objects.

BACKGROUND ART

Recent electronic instruments, typically smartphones, liquid crystal displays and automobile parts face demands not only for higher performance, but also for more space and energy savings. To meet such societal demands, electrical and electronic parts mounted thereon are made smaller and finer. Their assembly process thus becomes more complicated and difficult year by year.

The technology capable of transferring such micro-devices and parts selectively and at a time was recently developed (see Non-Patent Document 1), attracting engineers' attention.

This technology known as "micro transfer printing technology" uses the bonding force of an elastomer to pick up micro-parts at a time and transfer them to a desired place having a stronger bonding force.

As the micro transfer printing material, use is made of pressure-sensitive adhesive articles which are obtained from spin coating, screen printing or otherwise applying silicone PSA compositions to substrates and curing.

Silicone elastomers are known as the PSA material for use in this application. Many heat-cure type solventless silicone base PSAs were proposed (see Patent Documents 1 to 3).

On use of heat-cure type solventless silicone base PSAs, however, there arises the problem that the cured product shrinks during cooling to room temperature after heat curing, and the coating pattern has increased size errors.

To suppress such shrinkage, a silicone resin which is curable in a short time at room temperature by UV irradiation was developed (Patent Document 4).

However, there is a problem that after the material is coated to a desired pattern, the material will flow during transportation to the next process or with the lapse of time so that no PSA articles having the desired shape are obtained after curing. Another problem is that since the bonding force of the silicone material itself is utilized, which is insufficient as such, the applicable range of devices and parts is limited.

Therefore, there is a need for a UV-curable silicone PSA material which is not only curable in a short time at room temperature by UV irradiation, but also excellent in shape retention and bonding force.

PRIOR ART DOCUMENTS

Patent Documents

Patent Document 1: JP 5825738
Patent Document 2: JP 2631098
Patent Document 3: JP 5234064
Patent Document 4: JP 5989417

Non-Patent Documents

Non-Patent Document 1: JOHN A. ROGERS, "Transfer printing by kinetic control of adhesion to an elastomeric stamp", nature materials, Nature Publishing Group, 11 Dec. 2005, Vol. 6, pp. 33-38

SUMMARY OF INVENTION

Technical Problem

An object of the invention, which has been made under the above-mentioned circumstances, is to provide a UV cure type silicone PSA composition which is good in shape retention and cure and gives a cured product having appropriate adhesiveness as temporary adhesive, and a cured product thereof.

Solution to Problem

Making extensive investigations to attain the above object, the inventors have found that using a specific organopolysiloxane having a (meth)acryloyloxy-containing group, a monofunctional (meth)acrylate compound free of siloxane structure, a particular organopolysiloxane resin, and finely divided silica as a thixotropic agent, there is obtained a UV cure type silicone composition which is rapidly cured by UV irradiation while retaining the desired shape, the cured product having satisfactory adhesiveness. The invention is predicated on this finding.

The invention is defined below.

1. A UV cure type silicone pressure-sensitive adhesive composition comprising:
   (A) 100 parts by weight of an organopolysiloxane having, in the molecule, two groups of the following general formula (1):

[Chem. 1]

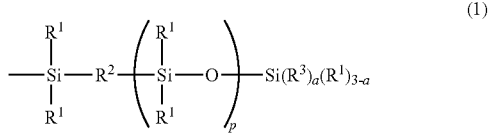

wherein $R^1$ is each independently a $C_1$-$C_{20}$ monovalent hydrocarbon group, $R^2$ is oxygen or a $C_1$-$C_{20}$ alkylene group, $R^3$ is an acryloyloxyalkyl, methacryloyloxyalkyl, acryloyloxyalkyloxy or methacryloyloxyalkyloxy group, p is a number in the range: $0 \leq p \leq 10$, and a is a number in the range: $1 \leq a \leq 3$, (B) 1 to 500 parts by weight of a monofunctional (meth)acrylate compound free of siloxane structure,
   (C) 1 to 5,000 parts by weight of an organopolysiloxane resin composed of (a) $R^4_3SiO_{1/2}$ units wherein $R^4$ is a $C_1$-$C_{10}$ monovalent hydrocarbon group and (b) $SiO_{4/2}$ units, a molar ratio of (a) units to (b) units being in the range of from 0.6/1 to 1.2/1,
   (D) 1 to 100 parts by weight of finely divided silica, and
   (E) 0.01 to 20 parts by weight of a photopolymerization initiator.

2. The UV cure type silicone pressure-sensitive adhesive composition of 1 wherein a ratio (AB) of viscosity A at 23° C. and a rotational speed of 2 rpm to viscosity B at 23° C. and a rotational speed of 10 rpm, that is, thixotropic index is from 1.1 to 10.

3. The UV cure type silicone pressure-sensitive adhesive composition of 1 or 2 wherein the viscosity B at a rotational speed of 10 rpm is in the range of 10 to 5,000 Pa·s.

4. A cured product of the UV cure type silicone pressure-sensitive adhesive composition of any one of 1 to 3.
5. A pressure-sensitive adhesive comprising the cured product of 4.
6. A pressure-sensitive adhesive sheet comprising the cured product of 4.
7. A microstructure transfer stamp comprising the cured product of 4.
8. The microstructure transfer stamp of 7, having at least one protrusion.
9. A microstructure transfer apparatus comprising the microstructure transfer stamp of 7 or 8.

Advantageous Effects of Invention

The UV cure type silicone rubber PSA composition is good in shape retention during coating and cure and its cured product has appropriate adhesiveness as a temporary adhesive.

DESCRIPTION OF EMBODIMENTS

Figure 1:
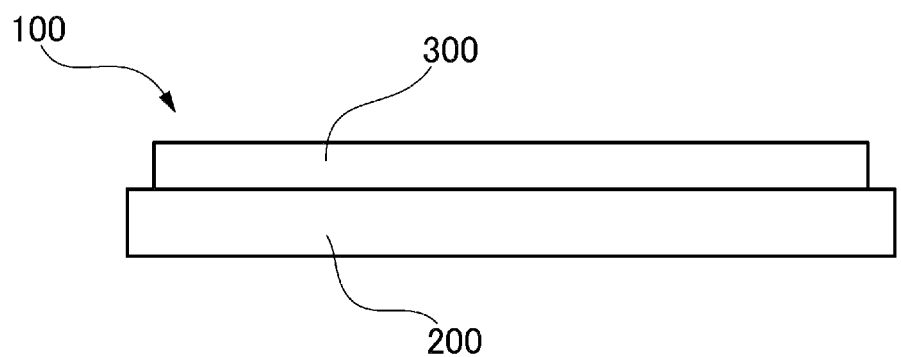
FIG. 1 is a schematic view for illustrating a microstructure transfer stamp in one embodiment of the invention.

Now the invention is described in detail.

The invention provides a UV cure type silicone pressure-sensitive adhesive (PSA) composition comprising:

(A) 100 parts by weight of an organopolysiloxane having two groups of the following general formula (1) in the molecule, (B) 1 to 500 parts by weight of a monofunctional (meth) acrylate compound free of siloxane structure, (C) 1 to 5,000 parts by weight of an organopolysiloxane resin composed of (a) $R^4_3SiO_{1/2}$ units wherein $R^4$ is a substituted or unsubstituted $C_1$-$C_{10}$ monovalent hydrocarbon group and (b) $SiO_{4/2}$ units, a molar ratio of (a) units to (b) units being in the range of from 0.6/1 to 1.2/1, (D) 1 to 100 parts by weight of finely divided silica, and (E) 0.01 to 20 parts by weight of a photopolymerization initiator.

(A) Organopolysiloxane

Component (A) used herein, which serves as a crosslinking component of the composition, is an organopolysiloxane having two groups of the following general formula (1) in the molecule and a backbone consisting essentially of repeating diorganosiloxane units.

[Chem. 2]

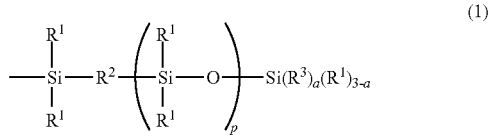

(1)

In formula (1), $R^1$ is each independently a $C_1$-$C_{20}$ monovalent hydrocarbon group, preferably $C_1$-$C_{10}$, and more preferably $C_1$-$C_8$ monovalent hydrocarbon group, exclusive of aliphatic unsaturated groups. $R^2$ is oxygen or a $C_1$-$C_{20}$, preferably $C_1$-$C_{10}$, more preferably $C_1$-$C_5$ alkylene group. $R^3$ is an acryloyloxyalkyl, methacryloyloxyalkyl, acryloyloxyalkyloxy or methacryloyloxyalkyloxy group, p is a number in the range: $0 \leq p \leq 10$, and "a" is a number in the range: $1 \leq a \leq 3$.

In formula (1), the $C_1$-$C_{20}$ monovalent hydrocarbon group $R^1$ may be straight, branched or cyclic. Examples thereof include alkyl groups such as methyl, ethyl, n-propyl, isopropyl, n-butyl, isobutyl, tert-butyl, n-hexyl, cyclohexyl, n-octyl, 2-ethylhexyl, and n-decyl; alkenyl groups such as vinyl, allyl (or 2-propenyl), 1-propenyl, isopropenyl, and butenyl; aryl groups such as phenyl, tolyl, xylyl, and naphthyl; and aralkyl groups such as benzyl, phenylethyl, and phenylpropyl.

Also, in these monovalent hydrocarbon groups, some or all of the carbon-bonded hydrogen atoms may be substituted by other substituents. Examples include halo- or cyano-substituted hydrocarbon groups such as chloromethyl, bromoethyl, trifluoropropyl, and cyanoethyl.

Of these, $R^1$ is preferably selected from $C_1$-$C_5$ alkyl groups and phenyl, with methyl, ethyl and phenyl being more preferred.

The $C_1$-$C_{20}$ alkylene group $R^2$ may be straight, branched or cyclic. Examples thereof include methylene, ethylene, propylene, trimethylene, tetramethylene, isobutylene, pentamethylene, hexamethylene, heptamethylene, octamethylene, nonamethylene, and decylene.

Inter alia, $R^2$ is preferably selected from oxygen, methylene, ethylene, and trimethylene, with oxygen and ethylene being more preferred.

Although the carbon count of the alkyl (or alkylene) group in acryloyloxyalkyl, methacryloyloxyalkyl, acryloyloxyalkyloxy and methacryloyloxyalkyloxy groups represented by $R^3$ is not particularly limited, it is preferably 1 to 10, more preferably 1 to 5. Examples of the alkyl group are those alkyl groups of 1 to 10 carbon atoms among the groups exemplified above for $R^1$.

Examples of group $R^3$ include those of the following formulae, but are not limited thereto.

[Chem. 3]

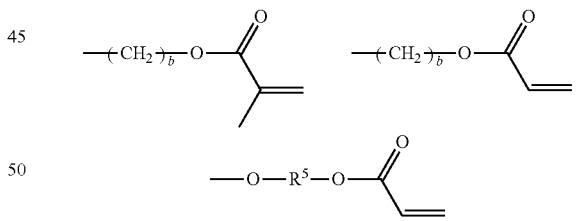

Herein b is a number in the range: $1 \leq b \leq 4$ and $R^5$ is a $C_1$-$C_{10}$ alkylene group.

In formula (1), p is a number in the range: $0 \leq p \leq 10$, preferably 0 or 1, and "a" is a number in the range: $1 \leq a \leq 3$, preferably 1 or 2.

In the molecule of the organopolysiloxane as component (A), the group of formula (1) may be attached to the end of the molecular chain and/or non-terminal positions of the molecular chain (i.e., positions midway the molecular chain or side chains from the molecular chain). For flexibility, the group of formula (1) is preferably present at only the end of the molecular chain.

In the molecule of the organopolysiloxane as component (A), silicon-bonded organic groups other than the group of formula (1) are as exemplified above for R¹, preferably C₁-C₁₂, more preferably C₁-C₁₀ monovalent hydrocarbon groups exclusive of aliphatic unsaturated groups.

Examples thereof are as exemplified above for R¹. Among others, alkyl, aryl and haloalkyl groups are preferred for ease of synthesis, with methyl, phenyl and trifluoropropyl being more preferred.

Component (A) has a molecular structure which is basically a linear or branched backbone (inclusive of partially branched, linear backbone) composed of repeating diorganosiloxane units, and is preferably a linear diorganopolysiloxane capped at both ends of the molecular chain with the group of formula (1).

Component (A) may be a homopolymer having such molecular structure, a copolymer having such molecular structure, or a mixture of two or more polymers.

The organopolysiloxane (A) preferably has a viscosity at 25° C. of 10 to 100,000 mPa·s, more preferably 10 to 50,000 mPa·s for enhancing workability of the composition and dynamic properties of the cured product. In the case of the linear organopolysiloxane, this viscosity range typically corresponds to a number average degree of polymerization of about 10 to about 2,000, more preferably about 50 to about 1,100. As used herein, the viscosity may be measured by a rotational viscometer, for example, BL, BH, BS or cone-plate type viscometer or rheometer (the same holds true, hereinafter).

As used herein, the degree of polymerization (or molecular weight) may be determined, for example, as a number average degree of polymerization (or number average molecular weight) by gel permeation chromatography (GPC) versus polystyrene standards using toluene as developing solvent (the same holds true, hereinafter).

Examples of the organopolysiloxane (A) include those of the following formulae (2) to (4), but are not limited thereto.

Herein R¹, R⁵ and b are as defined above, and n is such a number that the organopolysiloxane may have a viscosity within the above range, preferably a number of 1 to 800, more preferably 50 to 600.

The organopolysiloxane may be synthesized by well-known methods. For example, the polysiloxane of formula (2) may be obtained from reaction of the product of hydrosilylation reaction between a both end dimethylvinylsiloxy-capped dimethylsiloxane/diphenylsiloxane copolymer and chlorodimethylsilane, with 2-hydroxyethyl acrylate.

The organopolysiloxane of formula (3) is obtained as the product of hydrosilylation reaction between a both end dimethylvinylsiloxy-capped dimethylsiloxane/diphenylsiloxane copolymer and 3-(1,1,3,3-tetramethyldisiloxanyl)propyl methacrylate (CAS No. 96474-12-3).

The organopolysiloxane of formula (4) may be obtained from reaction of the product of hydrosilylation reaction between a both end dimethylvinylsiloxy-capped dimethylsiloxane/diphenylsiloxane copolymer and dichloromethylsilane, with 2-hydroxyethyl acrylate.

(B) Monofunctional (Meth)acrylate Compound Free of Siloxane Structure

Examples of the monofunctional (meth)acrylate compound free of siloxane structure (B) include isoamyl acrylate, lauryl acrylate, steady acrylate, ethoxy-ethylene glycol acrylate, ethoxy-triethylene glycol acrylate, 2-ethylhexyl-diglycol acrylate, phenoxyethyl acrylate, phenoxydiethylene glycol acrylate, tetrahydrofurfuryl acrylate, and isobornyl acrylate, which may be used alone or in admixture.

Of these, isobornyl acrylate is preferred.

The amount of the monofunctional (meth)acrylate compound added as component (B) is in the range of 1 to 500 parts by weight per 100 parts by weight of component (A). If the amount of component (B) added is less than 1 part by

[Chem. 4]

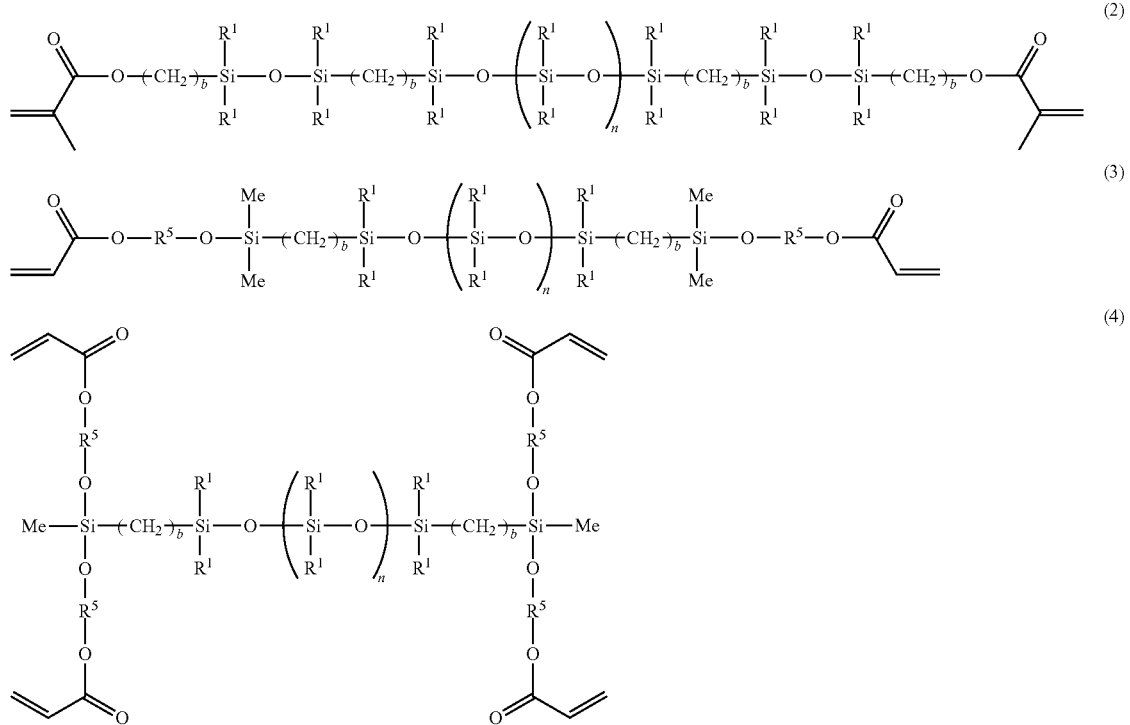

weight per 100 parts by weight of component (A), the composition lacks curability and the cured product has poor strength and adhesiveness. On the other hand, the viscosity of the overall composition can be adjusted by increasing the amount of component (B). However, if the amount of component (B) added exceeds 500 parts by weight per 100 parts by weight of component (A), the cured product has a higher hardness than necessary, failing to provide the desired adhesiveness.

The amount of component (B) added is preferably 10 to 200 parts by weight per 100 parts by weight of component (A).

(C) Organopolysiloxane Resin

Component (C) for imparting adhesiveness to the cured product is an organopolysiloxane resin composed of (a) $R^4{}_3SiO_{1/2}$ units wherein $R^4$ is a $C_1$-$C_{10}$ monovalent hydrocarbon group and (b) $SiO_{4/2}$ units, with a molar ratio of (a) units to (b) units being in the range of 0.6/1 to 1.2/1.

Examples of the $C_1$-$C_{10}$ monovalent hydrocarbon group $R^4$ include those monovalent hydrocarbon groups of 1 to 10 carbon atoms among the groups exemplified above for $R^1$. Of these, preference is given to $C_2$-$C_6$ alkyl groups such as methyl, ethyl, n-propyl, and n-butyl; $C_6$-$C_{10}$ aryl groups such as phenyl and tolyl; $C_7$-$C_{10}$ aralkyl groups such as benzyl; and $C_2$-$C_6$ alkenyl groups such as vinyl, allyl, and butenyl.

Like $R^1$, some or all of the carbon-bonded hydrogen atoms on the monovalent hydrocarbon group $R^4$ may be substituted by substituents as described above.

In component (C), the molar ratio of (a) $R^4{}_3SiO_{1/2}$ units (M units) and (b) $SiO_{4/2}$ units (Q units), that is, M units to Q units is in the range of 0.6/1 to 1.2/1. If the molar ratio of M units is less than 0.6, the cured product may experience a drop of bonding force or tack. If the molar ratio exceeds 1.2, the cured product may experience a drop of bonding or retaining force.

For adjusting the bonding force, retaining force, and tack of a cured product to an appropriate range, the molar ratio of M units to Q units is preferably in the range of 0.7/1 to 1.2/1.

The amount of organopolysiloxane resin as component (C) added is in the range of 1 to 5,000 parts, preferably 10 to 1,000 parts, and more preferably 100 to 500 parts by weight per 100 parts by weight of component (A).

(D) Finely Divided Silica

Component (D) serves mainly to impart thixotropy to the composition. Examples include fumed silica (dry silica) and precipitated silica (wet silica), with fumed silica (dry silica) being preferred. Incorporation of component (D) is effective for enhancing the hardness of the cured product and preventing misalignment in transfer of parts and the like.

Although the specific surface area of component (D) is not particularly limited, it is preferably 50 to 400 $m^2/g$, more preferably 100 to 350 $m^2/g$. Silica with a specific surface area of less than 50 $m^2/g$ may fail to impart sufficient thixotropy to the composition whereas silica with a specific surface area greater than 400 $m^2/g$ may excessively increase the viscosity of the composition and adversely affect workability. Notably, the specific surface area is measured by the BET method.

The finely divided silica as component (D) may be used alone or in admixture.

While the finely divided silica may be used as such, it may be treated with a surface hydrophobizing agent prior to use. When treated, finely divided silica may be treated with a surface treating agent prior to use, or simultaneously kneaded and surface-treated by adding a surface treating agent during kneading.

Examples of the surface treating agent include alkylalkoxysilanes, alkylchlorosilanes, alkylsilazanes, and silane coupling agents. While the agent may be used alone, two or more agents may be used at a time or different times.

In the composition, the amount of component (D) added is in the range of 1 to 100 parts, preferably 5 to 80 parts, and more preferably 10 to 50 parts by weight per 100 parts by weight of component (A).

If the amount of component (D) is less than 1 part by weight, the composition fails to develop sufficient thixotropy and has poor shape retention. If the amount exceeds 100 parts by weight, the composition has too high a viscosity that significantly interferes with working.

(E) Photopolymerization Initiator

Examples of the photopolymerization initiator which can be used herein include 2,2-diethoxyacetophenone, 2,2-dimethoxy-1,2-diphenylethan-1-one (Irgacure 651, BASF), 1-hydroxycyclohexyl phenyl ketone (Irgacure 184, BASF), 2-hydroxy-2-methyl-1-phenylpropan-1-one (Irgacure 1173, BASF), 2-hydroxy-1-{4-[4-(2-hydroxy-2-methyl-propionyl)-benzyl]-phenyl}-2-methyl-propan-1-one (Irgacure 127, BASF), phenylglyoxylic acid methyl ester (Irgacure MBF, BASF), 2-methyl-1-[4-(methylthio)phenyl]-2-morpholinopropan-1-one (Irgacure 907, BASF), 2-benzyl-2-dimethylamino-1-(4-morpholinophenyl)-1-butanone (Irgacure 369, BASF), bis(2,4,6-trimethylbenzoyl)phenylphosphine oxide (Irgacure 819, BASF), and 2,4,6-trimethylbenzoyl-diphenylphosphine oxide (Irgacure TPO, BASF). They may be used alone or in admixture.

Of these, 2,2-diethoxyacetophenone, 2-hydroxy-2-methyl-1-phenylpropan-1-one (Irgacure 1173, BASF), bis (2,4,6-trimethylbenzoyl)phenylphosphine oxide (Irgacure 819, BASF), and 2,4,6-trimethylbenzoyl-diphenylphosphine oxide (Irgacure TPO, BASF) are preferred from the aspect of compatibility with component (A).

The amount of the photopolymerization initiator added is in the range of 0.01 to 20 parts by weight per 100 parts by weight of component (A). An amount of less than 0.01 part by weight leads to insufficient curability whereas an amount in excess of 20 parts by weight adversely affects depth-curability.

The inventive composition may further comprise additives such as colorants (i.e., pigments and dyes), silane coupling agents, adhesive aids, polymerization inhibitors, antioxidants, and light resistance stabilizers (for example, UV absorbers and photostabilizers) as long as the benefits of the invention are not impaired.

Also, the composition may be properly mixed with other resin compositions prior to use.

The UV cure type silicone PSA composition may be obtained by combining components (A) to (E) and other optional components in any desired order and stirring. The machine used for stirring operation is not particularly limited. Suitable machines include a mortar grinder, three-roll mill, ball mill, and planetary mixer. These machines may also be used in a suitable combination.

In the UV cure type silicone PSA composition, a ratio (AB) of viscosity A at 23° C. and a rotational speed of 2 rpm to viscosity B at 23° C. and a rotational speed of 10 rpm, that is, thixotropic index is preferably from 1.1 to 10, more preferably from 1.5 to 8.0, even more preferably from 1.8 to 7.0, and most preferably from 2.0 to 6.5. If the thixotropic index is less than 1.1, the composition will flow after coating on substrates, making it difficult to obtain a cured product having the desired shape after UV irradiation. If the thixotropic index exceeds 10, workability may be significantly worsened.

From the aspects of shape retention and workability during coating, the UV cure type silicone PSA composition preferably has a viscosity in the range of 10 to 5,000 Pa·s, more preferably 50 to 3,000 Pa·s, and even more preferably 100 to 1,500 Pa·s, as measured at 23° C. and a rotational speed of 10 rpm by a rotational viscometer. If the viscosity is less than 10 Pa·s, the composition is likely to flow. If the viscosity exceeds 5,000 Pa·s, workability may be significantly worsened.

The UV cure type silicone PSA composition is rapidly cured on UV irradiation.

Examples of the light source for UV irradiation include UV LED lamps, high-pressure mercury lamps, extra-high pressure mercury lamps, metal halide lamps, carbon arc lamps, and xenon lamps.

For example, when the inventive composition is shaped into a sheet of about 2.0 mm thick, it is preferably given a UV exposure dose (accumulative light quantity) of 1 to 10,000 mJ/cm$^2$, more preferably 10 to 6,000 mJ/cm$^2$. Specifically, when UV having an illuminance of 100 mW/cm$^2$ is used, UV may be irradiated for about 0.01 to about 100 seconds.

The cured product obtained from UV irradiation preferably has a bonding force of 0.01 to 100 MPa, more preferably 0.02 to 50 MPa in consideration of a balance between adhesion and release of the object to be transferred although the bonding force is not particularly limited.

Also, the UV cure type silicone PSA composition may be used as sheet or film-like PSA articles by coating it to various substrates and UV curing.

The substrate is not particularly limited and plastic films, glass and metals may be used.

Suitable plastic films include polyethylene films, polypropylene films, polyester films, polyimide films, polyvinyl chloride films, polyvinylidene chloride films, polyvinyl alcohol films, polycarbonate films, polystyrene films, ethylene-vinyl acetate copolymer films, ethylene-vinyl alcohol copolymer films, and triacetyl cellulose films.

The glass used herein is not particularly limited with respect to the thickness and type, and even chemically strengthened glass is acceptable.

For improving the adhesion between the substrate and the PSA layer, the substrate may be treated such as by primer treatment or plasma treatment, prior to use.

The coating means or method may be selected as appropriate from well-known coating means or methods such as a spin coater, comma coater, lip coater, roll coater, die coater, knife coater, blade coater, rod coater, kiss coater, gravure coater, screen printing, dipping and casting methods.

Since the UV cure type silicone PSA composition is of solventless type, a cured product thereof can also be prepared by potting in a mold.

In case bubbles are entrapped in the potting step of pouring the composition into a mold, the bubbles can be removed under reduced pressure. The mold used herein may be, for example, a resist template, that is, a photoresist film (on a silicon wafer) which is engraved with a desired contour (raised and recessed portions).

If it is desired to take out the cured product from the mold, preferably the mold is treated with a parting agent before potting of the composition. For example, fluorine and silicone base parting agents may be used.

The UV cure type silicone PSA composition is generally used as such. Where the composition must be improved in handling and coating to substrates, it is acceptable to dilute the composition with an organic solvent prior to use as long as the desired properties are not compromised.

Figure 2:
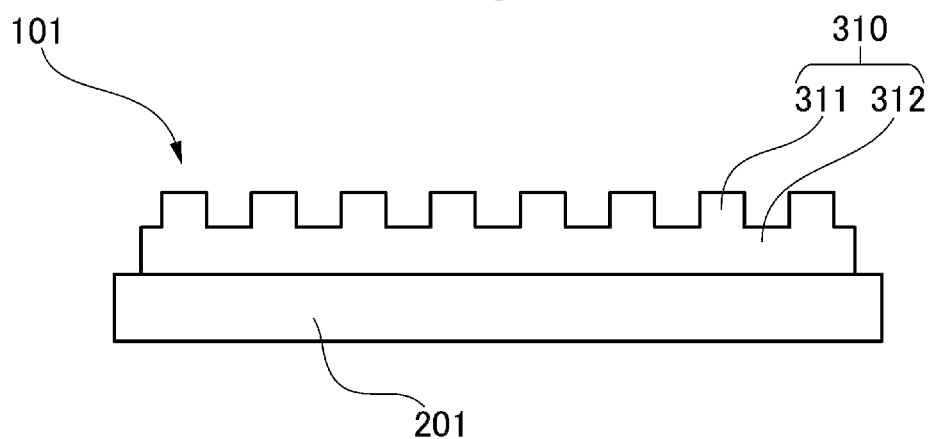
FIG. 2 is a schematic view for illustrating a microstructure transfer stamp in another embodiment of the invention.

As shown in FIGS. 1 and 2, the cured product of the UV cure type silicone PSA composition is used as microstructure transfer stamps 100 and 101 for transferring miniature devices and parts.

Examples of the microstructure include various electronic devices such as LED chips, driver ICs, resistors, coils, capacitors, and photodetectors. The microstructure is not limited to electric circuit devices as long as it has such size and weight that the microstructure transfer stamp can transfer. The microstructure transfer stamp may improve the productivity in the step of transferring miniature devices and parts, especially of micrometer scale.

In FIG. 1, the microstructure transfer stamp 100 comprises a substrate 200 and a cured layer 300 of the UV cure type silicone PSA composition thereon. In this embodiment, the cured composition layer 300 may have any size falling within the extent of the substrate 200, and even exactly the same size as the substrate 200.

The material of the substrate 200 is not particularly limited. Examples include plastic films, glass, synthetic quartz, and metals. Also, the substrate is not particularly limited with respect to the thickness and type, and even chemically strengthened glass is acceptable. For improving the adhesion between the substrate and the PSA layer, the substrate may be subjected to primer treatment or plasma treatment, prior to use. For the purpose of preventing misalignment in transferring microstructures and thereby improving the transfer accuracy, synthetic quartz having high flatness is preferably used.

The method of forming the cured product 300 on the substrate 200 is not particularly limited. For example, the method may be either a method comprising the steps of directly applying the UV cure type silicone PSA composition in uncured state onto the substrate 200 and curing the composition or a method comprising the step of bonding a sheet-like cured product of the UV cure type silicone PSA composition to the substrate 200.

In the method comprising the steps of directly applying the UV cure type silicone PSA composition onto the substrate 200 and curing the composition, a microstructure transfer stamp 100 may be obtained by coating the silicone PSA composition onto the substrate 200 and then irradiating UV to cure the composition.

The coating means or method may be selected as appropriate from well-known coating means or methods such as a spin coater, comma coater, lip coater, roll coater, die coater, knife coater, blade coater, rod coater, kiss coater, gravure coater, screen printing, dipping and casting methods.

After the silicone PSA composition is coated to the substrate by any of these methods, the composition may be cured by UV irradiation while carrying out press molding or compression molding. There is obtained a microstructure transfer stamp 100 having high flatness.

In the method comprising the step of bonding the sheet-like cured product of the UV cure type silicone PSA composition to the substrate 200, a microstructure transfer stamp 100 may be obtained by molding the composition into a sheet and bonding the sheet to the substrate 200.

The method for molding the UV cure type silicone PSA composition into a sheet may be selected as appropriate from molding methods such as roll forming, press molding, transfer molding, and compression molding. The composition is preferably molded into a sheet-like cured product while sandwiching the composition between plastic films for preventing dust deposition or suppressing oxygen cure inhibition. When the resulting sheet-like cured product is larger than the desired size, it may be cut to the desired size. In order to increase the adhesion of the sheet-like cured product to the substrate 200, either one or both of the bonding surfaces may be subjected to plasma treatment, excimer laser treatment or chemical treatment. Any adhesives or pressure-sensitive adhesives may be used for enhancing the bonding strength. Examples thereof include silicone base, acrylic base, and epoxy base adhesives.

The bonding method used herein may be, for example, roll bonding or vacuum pressing.

The silicone PSA cured layer 300 in the microstructure transfer stamp 100 preferably has a thickness of 1 μm to 1 cm, more preferably 10 μm to 5 mm from the aspects of moldability and flatness.

Referring to FIG. 2, the microstructure transfer stamp 101 comprises a substrate 201 and a cured layer 310 of the UV cure type silicone PSA composition thereon. The material of substrate 201 is as exemplified above for substrate 200. The silicone PSA cured layer 310 has protrusions 311 on the surface. A base layer 312 may be formed underneath the protrusions 311.

The method of forming the cured layer 310 on the substrate 201 is not particularly limited. Examples include a method comprising the step of directly molding the cured layer 310 on the substrate 201 by in-mold shaping and a method comprising the step of bonding a sheet-like cured product having the protrusions 311 to the substrate 201.

Figure 3:
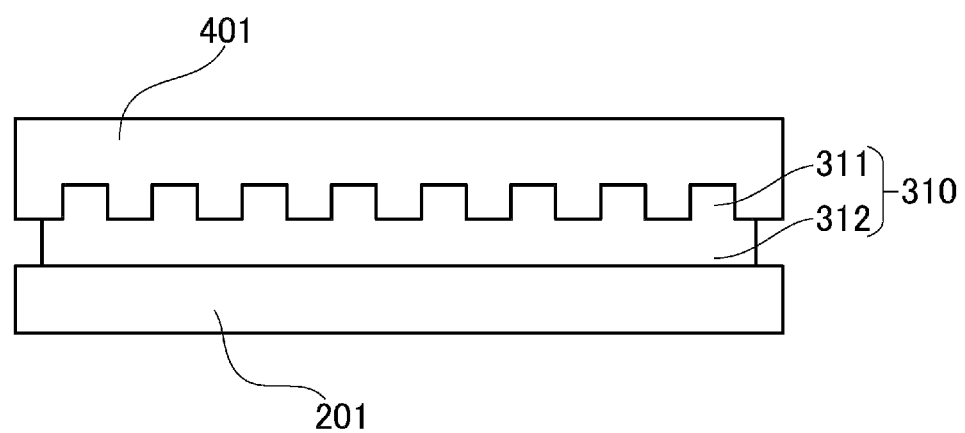
FIG. 3 is a schematic view for illustrating one exemplary method of manufacturing the microstructure transfer stamp of the invention.

In the method comprising the step of directly molding the silicone PSA cured layer 310 on the substrate 201 by in-mold shaping, the microstructure transfer stamp 101 may be obtained as shown in FIG. 3 by filling the silicone PSA composition between the substrate 201 and a mold 401, irradiating UV to cure the composition, and then removing the mold 401.

The mold 401 used herein may be, for example, a resist template, that is, a photoresist film (on a silicon wafer or quartz substrate) which is engraved with a desired contour (raised and recessed portions) or a resin template, that is, a UV cure type resin which is engraved with a desired contour by pattern wise exposure. In the case of resin templates, various plastic films may be used as the substrate.

The step of filling the silicone PSA composition between the substrate 201 and the mold 401 may be performed by applying the silicone PSA composition to the substrate 201 and/or the mold 401 and bonding them together. The applying and bonding methods may be as described above. There is a possibility that small bubbles are entrapped in the mold 401 during the applying step. This problem can be solved by vacuum bonding or debubbling under reduced pressure.

After the silicone PSA composition is applied to the substrate by any of these methods, the composition is cured by UV irradiation while carrying out press molding, compression molding or roll press molding, thereby forming the microstructure transfer stamp 101.

In the method of bonding the sheet-like silicone PSA cured product having protrusions 311 to the substrate 201, the microstructure transfer stamp 101 may be obtained by molding the silicone PSA composition into a sheet-like cured product having protrusions 311 and bonding the sheet to the substrate 201.

The method for molding the UV cure type silicone PSA composition into a sheet-like cured product having protrusions 311 may be selected as appropriate from molding methods such as roll forming, press molding, transfer molding, and compression molding methods using a mold provided with the same contour as the mold 401.

The composition is preferably molded into a sheet-like cured product while sandwiching the composition between plastic films for preventing dust deposition or suppressing oxygen cure inhibition. When the resulting sheet-like cured product is larger than the desired size, it may be cut to the desired size.

In order to improve the adhesion of the sheet-like cured product to the substrate 201, the bonding surfaces may be subjected to plasma treatment, excimer laser treatment or chemical treatment. Various adhesives and pressure-sensitive adhesives as described above may be used for enhancing the bonding strength.

The bonding method used herein may be, for example, roll bonding or vacuum pressing.

The size and arrangement of the protrusions 311 may be designed depending on the size and desired arrangement of microstructures to be transferred.

The upper surface of the protrusions 311 is flat. The surface shape is not limited and encompasses circular, oval, rectangular and other shapes. In the case of rectangular shape, the edges may be rounded. The upper surface of the protrusions 311 preferably has a width of 0.1 μm to 1 cm, more preferably 1 μm to 1 mm.

The side wall of the protrusions 311 is not limited in morphology and may be either vertical or oblique.

The protrusions 311 preferably have a height of 0.1 μm to 1 cm, more preferably 1 μm to 1 mm.

The pitch distance between spaced-apart adjacent protrusions 311 is preferably 0.1 μm to 10 cm, more preferably 1 μm to 1 mm.

The base layer 312 preferably has a thickness of 0.1 μm to 1 cm, more preferably 1 μm to 5 mm.

The microstructure transfer stamp defined above may be used by mounting it on a setup to construct a microstructure transfer apparatus. Although the means for mounting it on a setup is not particularly limited, for example, vacuum chucks or pressure-sensitive adhesive sheets may be used. The transfer of microstructures with the microstructure transfer apparatus can be achieved by picking up microstructures such as devices due to the bonding force of the microstructure transfer stamp, moving them to the desired place, and releasing them.

EXAMPLES

Examples are given below for further illustrating the invention although the invention is not limited thereto.

The compounds used in Examples are shown below.
Component (A)

[Chem. 5]

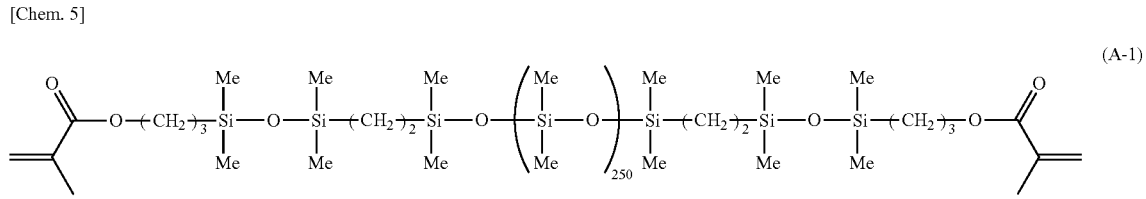

-continued

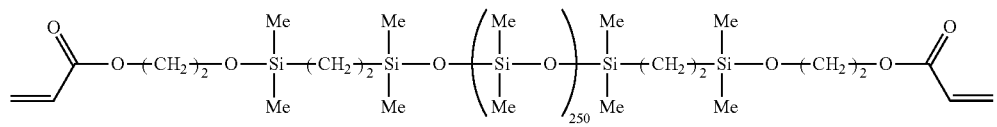
(A-2)

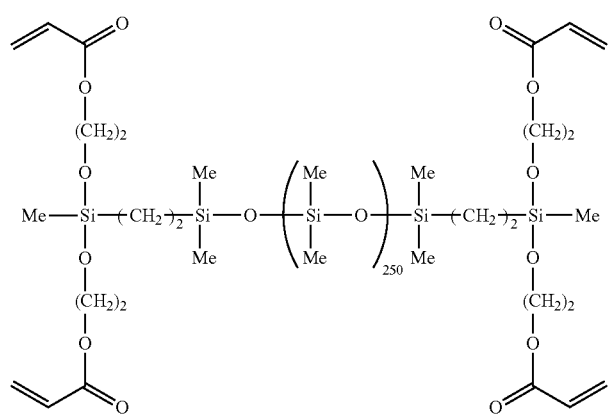
(A-3)

Component (B)
(B-1) Isobornyl acrylate (Light Acrylate IB-XA, Kyoeisha Chemical Co., Ltd.)

Component (C)
(C-1) A 60 wt % toluene solution of an organopolysiloxane resin consisting of $Me_3SiO_{1/2}$ units and $SiO_2$ units in a molar ratio of ($Me_3SiO_{1/2}$ units)/($SiO_2$ units) of 0.85/1 (number average molecular weight 3,500)

Component (D)
(D-1) Dry silica (Reolosil DM-30S, Tokuyama Corp., specific surface area 230 $m^2/g$)

Component (E)
(E-1) 2-hydroxy-2-methyl-1-phenylpropan-1-one (Irgacure 1173, BASF Japan, Ltd.)

Examples 1 to 3

Silicone compositions as shown in Table 1 were prepared by blending components (A) to (E) in accordance with the formulation in Table 1 and distilling off toluene at 100° C. in vacuum. Notably, the viscosity of the composition in Table 1 is as measured at 23° C. and a rotational speed of 10 rpm by a rotational viscometer. The thixotropic index is determined by computing a ratio (A/B) of the viscosity A at 23° C. and a rotational speed of 2 rpm to the viscosity B at 23° C. and a rotational speed of 10 rpm.

The silicone composition was cured in nitrogen atmosphere at room temperature (25° C.) by exposure to UV of wavelength 365 nm from an Eye UV electronic control instrument (model: UBX0601-01, Eye Graphics Co., Ltd.) such that the exposure dose of UV light was 4,000 $mJ/cm^2$. The hardness of the cured product was measured according to The Society of Rubber Industry, Japan Standard, SRIS0101.

The adhesiveness of the cured product was measured by a compact tabletop tester EZ-SX (Shimadzu Corp.). The procedure included pressing a stainless steel (SUS) probe of 1 mm square to the cured product of 1 mm thick under 1 MPa for 15 seconds and then pulling back the probe at a rate of 200 mm/min while measuring the load (bonding force) required for pulling.

TABLE 1

| | | Example | | |
|---|---|---|---|---|
| | | 1 | 2 | 3 |
| Formulation (parts by weight) | A-1 | 100 | | |
| | A-2 | | 100 | |
| | A-3 | | | 100 |
| | B-1 | 25 | 19 | 25 |
| | C-1 | 125 | 194 | 125 |
| | D-1 | 18 | 16 | 38 |
| | E-1 | 3 | 5 | 3 |
| Physical properties of composition | Viscosity (Pa · s) | 120 | 450 | 1,200 |
| | Thixotropic index | 3.0 | 2.0 | 6.0 |
| Physical properties of cured product | Hardness (Type A) | 24 | 24 | 54 |
| | Bonding force (MPa) | 1.6 | 2.3 | 1.5 |

As seen from Table 1, the UV cure type silicone PSA compositions prepared in Examples 1 to 3 have an adequate viscosity, thixotropy and good shape retention. The cured products thereof have excellent adhesiveness and are thus useful as temporary adhesive for transferring miniature objects such as devices.

REFERENCE SIGNS LIST 100, 101 microstructure transfer stamp
200, 201 substrate
300, 310 cured composition layer
311 protrusions
312 base layer
401 mold

The invention claimed is:
1. A UV cure type silicone pressure-sensitive adhesive composition comprising:
(A) 100 parts by weight of an organopolysiloxane having, in the molecule, two groups of the following general formula (1) and a backbone consisting essentially of repeating diorganosiloxane units, wherein the number of the repeating diorganosiloxane units is 1 to 600:

[Chem. 1]

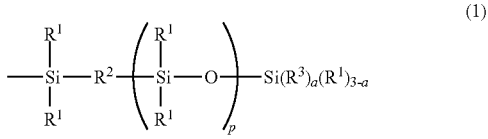

wherein $R^1$ is each independently a $C_1$-$C_{20}$ monovalent hydrocarbon group, $R^2$ is oxygen or a $C_1$-$C_{20}$ alkylene group, $R^3$ is an acryloyloxyalkyl, methacryloyloxyalkyl, acryloyloxyalkyloxy or methacryloyloxyalkyloxy group, p is a number in the range: $0 \leq p \leq 10$, and a is a number in the range: $1 \leq a \leq 3$, (B) 1 to 500 parts by weight of a monofunctional (meth) acrylate compound free of siloxane structure, (C) 1 to 5,000 parts by weight of an organopolysiloxane resin composed of (a) $R^4{}_3SiO_{1/2}$ units wherein $R^4$ is a $C_1$-$C_{10}$ monovalent hydrocarbon group and (b) $SiO_{4/2}$ units, a molar ratio of (a) units to (b) units being in the range of from 0.6/1 to 1.2/1, (D) 1 to 100 parts by weight of finely divided silica, and (E) 0.01 to 20 parts by weight of a photopolymerization initiator.

2. The UV cure type silicone pressure-sensitive adhesive composition of claim 1 wherein a ratio (AB) of viscosity A at 23° C. and a rotational speed of 2 rpm to viscosity B at 23° C. and a rotational speed of 10 rpm, that is, thixotropic index is from 1.1 to 10.

3. The UV cure type silicone pressure-sensitive adhesive composition of claim 1 wherein a viscosity B at a rotational speed of 10 rpm is in the range of 10 to 5,000 Pa·s.

4. A cured product of the UV cure type silicone pressure-sensitive adhesive composition of claim 1.

5. A pressure-sensitive adhesive comprising the cured product of claim 4.

6. A pressure-sensitive adhesive sheet comprising the cured product of claim 4.

7. A microstructure transfer stamp comprising the cured product of claim 4.

8. The microstructure transfer stamp of claim 7, having at least one protrusion.

9. A microstructure transfer apparatus comprising the microstructure transfer stamp of claim 7.

* * * * *